(12) United States Patent
Calvano

(10) Patent No.: US 11,580,006 B2
(45) Date of Patent: Feb. 14, 2023

(54) ANNOTATED DETERMINISTIC TRACE ABSTRACTION FOR ADVANCED DYNAMIC PROGRAM ANALYSIS

(71) Applicant: Raytheon Company, Waltham, MA (US)

(72) Inventor: Andrew R. Calvano, Draper, UT (US)

(73) Assignee: Raytheon Company, Waltham, MA (US)

( * ) Notice: Subject to any disclaimer, the term of this patent is extended or adjusted under 35 U.S.C. 154(b) by 26 days.

(21) Appl. No.: 17/164,554

(22) Filed: Feb. 1, 2021

(65) Prior Publication Data

US 2022/0245051 A1 Aug. 4, 2022

(51) Int. Cl.

| G06F 9/44 | (2018.01) |
|---|---|
| G06F 11/36 | (2006.01) |
| G06F 16/172 | (2019.01) |
| G06F 9/54 | (2006.01) |
| G06F 9/455 | (2018.01) |
| G06F 16/14 | (2019.01) |

(52) U.S. Cl.
CPC ........ *G06F 11/364* (2013.01); *G06F 9/45558* (2013.01); *G06F 9/54* (2013.01); *G06F 16/148* (2019.01); *G06F 16/172* (2019.01); *G06F 2009/45583* (2013.01)

(58) Field of Classification Search
CPC ...... G06F 9/45558; G06F 9/54; G06F 11/364; G06F 16/148; G06F 16/172; G06F 2009/45583
USPC ................................................. 717/124–133
See application file for complete search history.

(56) References Cited

U.S. PATENT DOCUMENTS

| 8,578,340 | B1 * | 11/2013 | Daudel | G06F 11/3636 |
| | | | | 710/266 |
| 8,924,912 | B2 * | 12/2014 | Ho | G06F 30/20 |
| | | | | 716/136 |
| 10,740,219 | B2 * | 8/2020 | Myers | G06F 11/3093 |
| 10,747,645 | B2 * | 8/2020 | Myers | G06F 11/3636 |
| 2018/0356878 | A1 * | 12/2018 | Dudekula | G09B 5/02 |
| 2021/0216439 | A1 * | 7/2021 | Mola | G06F 11/28 |

OTHER PUBLICATIONS

Guo et al., "Towards Pragmatic Library-based Replay", 2008, Microsoft Research, retrieved from https://www.microsoft.com/en-us/research/publication/towards-pragmatic-library-based-replay/, 10 pages (Year: 2008).*

Guo et al., "R2: An Application-Level Kernel for Record and Replay", 2008, OSDI'08: Proceedings of the 8th USENIX conference on Operating systems design and implementation, pp. 193-208 (Year: 2008).*

* cited by examiner

*Primary Examiner* — Ted T. Vo
(74) *Attorney, Agent, or Firm* — Schwegman Lundberg & Woessner, P.A.

(57) ABSTRACT

A virtual machine that includes a plurality of processes executes on a computer processor. A record-replay file, trace annotations, and an application program interface request are received into the computer processor. The trace annotations and application program interface request are translated into record-replay commands. The record-replay commands capture data from the record-replay file, and the captured data can be accessed via a programmatic interface.

18 Claims, 4 Drawing Sheets

ANNOTATED DETERMINISTIC TRACE ABSTRACTION FOR ADVANCED DYNAMIC PROGRAM ANALYSIS

TECHNICAL FIELD

Embodiments described herein generally relate to an annotated deterministic trace abstraction for advanced dynamic computer program analysis.

BACKGROUND

Tracing computer program execution is a prerequisite for many types of dynamic computer program analysis. While traces contain a large amount of detail about the execution of a program, the overhead to collect these details can be very large, and the overhead to store these details can sometimes be even larger. Additionally, traces are usually a one-off event because once a tracing tool logs a trace, a trace cannot add or derive new information. In such situations, the analysis can therefore only focus on the data that the tracing tool captured during the initial trace.

In addition to requiring a large amount of data, execution tracing is typically slow. Each instruction and value of interest must be logged to disk. To capture specific execution properties, instrumentation programs (software that monitors an execution of a program) must be coded in advance of the execution tracing. That is, in prior systems, every program instruction is executed and monitored by an instrumentation program. This coding is required to implement such functions as memory tracing, function call tracing, data flow tracing, control flow tracing, data value capture, and library loads. The program instrumentation framework captures trace information once per execution.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
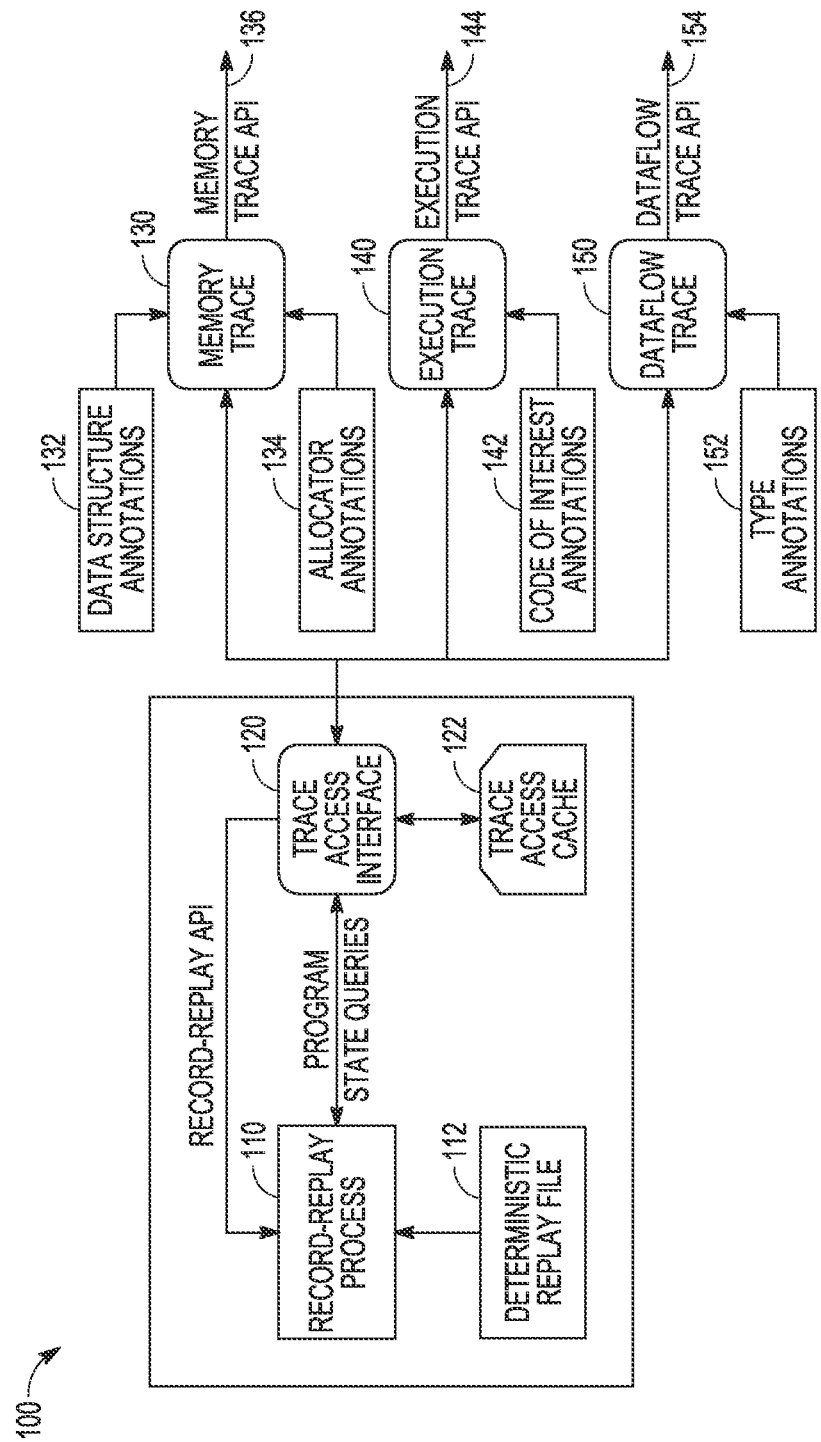
FIG. 1 is a block diagram of an example embodiment of a system of annotated deterministic trace abstraction for advanced dynamic program analyses.

In an embodiment, a record-replay technology is leveraged to implement a new tracing technology abstraction. This new technology can be referred to as a deterministic trace abstraction, and it can be used in connection with debugging computer programs, processes, and systems. Any type of record-replay technology can be used in connection with the embodiments of this disclosure, such as DejaVM (a product of the Raytheon Corporation) and PANDA (an open source fork of QEMU). An embodiment uses record-replay technology to capture a minimal amount of data that can be used to reproduce desired data by replaying the execution.

The abstraction presents an opportunity to overcome many of the previous limitations of prior art tracing systems, By using a record-replay file containing a recorded execution of a process and/or system of processes, a user can query executed instructions, program states, and taint statuses over time and on-demand using an application program interface (API). This makes storing each executed instruction and relevant program state unnecessary as the deterministic replay file implicitly includes this information. Additionally, certain record-replay systems can operate as part of a system of systems, and the trace abstraction is easily extendable to multi-VM (virtual machine) systems. The abstraction provides an accessible interface for higher level tracing interfaces to leverage for targeted property extraction. The interface enables higher-level interfaces to access, for any point in the recorded execution, executed instructions. The interface further enables a user to retrieve register and memory values, and to perform and query the results from a taint analysis. To increase performance of the abstraction, a large cache can be used so that commonly accessed data are immediately available to higher-level interfaces. Static annotations can be supplied to the higher-level trace interfaces for a more abstracted analysis. Additionally, the incorporation of static annotations into higher-level APIs, thereby building on trace abstraction, allows for many types of dynamic program analyses. While such dynamic program analyses were previously, possible, embodiments of the current disclosure are able to perform the dynamic program analyses in a more flexible manner. For example, embodiments use the trace abstraction over the record-replay instead of coding in advance. In short, trace abstraction embodiments disclosed herein are backed by a deterministic, programmatic full system replay of data recorded by a record-replay system.

Consequently, in an embodiment, rather than capture data explicitly, a record-replay technology is used to re-execute a program, process, and/or a system of programs and processes from deterministic recording points to retrieve execution data on demand, Higher level trace APIs code to the abstraction to gather data expressed in annotations. These annotations include points of execution, execution sequences, and/or descriptions of which data should be collected and returned by a respective API.

There are several advantages to one or more of the embodiments disclosed herein. An embodiment requires less disk overhead than traditional execution tracing, and the record-replay technology can execute in hardware accelerated mode (e.g., VMX). Limited instrumentation programming is needed to capture the deterministic replay of a virtual machine (VM) program execution. An embodiment includes the previously mentioned high level APIs that are informed by annotations that code to the abstraction. The annotations supplied by users or by automation enable a configurable trace collection. As little or as much data can be collected as the user would like. The back end of the abstraction can be replayed or retrieved from the cache on demand to return API requested values. For example, the API request can include such requests as a retrieval of dataflow state per register/memory, the state of data structures over time, etc.

Referring to FIG. 1, a deterministic trace abstraction system 100 is illustrated. A record-replay process 110, as is known in the art, records the details of an execution of a computer process. These details are replayed using the deterministic replay file 112. As noted above, such known record-replay processes include DejaVM and PANDA. The recorded data are used in the deterministic trace abstraction. Specifically, a user provides data structure annotations 132 and/or allocator annotations 134 to a memory trace 130, code of interest annotations 142 to an execution trace 140, and/or type annotations 152 to a dataflow trace 150. It is noted that the memory, execution, and dataflow traces are just examples, and that other types of traces could also be used. As noted above, these annotations are provided by a user or automation, and depend upon the types of data/information that the user or automation would like to retrieve from the recorded computer process. The trace access interface 120 converts the annotations to commands of the particular record-replay technology, and the commands access the data of the recorded virtual machine computer process. These data are then returned to and presented to the user, in the embodiment of FIG. 1, via the memory trace API 136, the execution trace API 144, and the dataflow trace API 154.

For example, the code of interest annotations 142 may identify a particular block of code of interest, the trace access interface 120 creates record-replay, commands to retrieve data regarding the execution of the code of interest, and the data are returned to the user via the execution trace API 144. These data can include all observed executions over time for the block of code of interest. As another example, a user could request all unique values for a particular memory location over time. The dataflow trace 150 can track how data are propagated throughout the execution of a program. For example, the dataflow trace 150 can track all http web traffic during a program execution. In summary, the trace access interface 120 translates user requests from the memory trace 130, the execution trace 140, and the dataflow trace 150 into record-replay commands to access, in an on-demand fashion, the record-replay file. These requests can be time sensitive, such as when a user is seeking all data values for a particular time period. FIG. 1 further illustrates that the record-replay data can be stored in a trace access cache 122 for faster access.

Figure 1A:
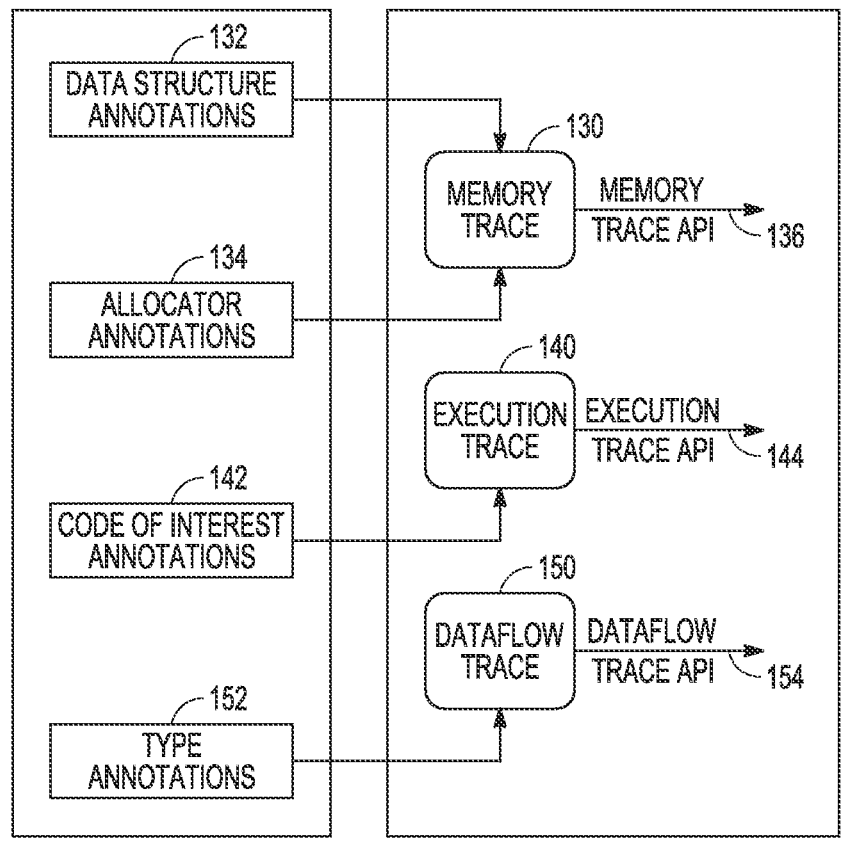
FIG. 1A is a block diagram of an example embodiment of annotations and application program interfaces of a system of annotated deterministic trace abstraction for advanced dynamic program analyses.

Referring now to FIG. 1A, further details and examples of the annotations and APIs are discussed. Trace annotations are supplied ahead of time by the user or automation, for example, data structure usage locations or taint sources are provided by a static analysis tool. Both the trace annotations and API requests are used in combination to generate the record-replay commands which capture the required data in a targeted fashion. As an example, a user can issue a dataflow API request 154 to retrieve time sensitive taint status of a particular register or a particular memory location. This request is used in combination with the supplied type annotations to retrieve the requested data. For example, taint source annotations can be used with a user request for a particular register taint status. The annotations drive information collection from the recorded program execution for the respective dataflow trace API 154. As another example, a user may want to examine a particular data structure, such as a C++ class structure, over time. Once again, the request is used in combination with the supplied type annotations to retrieve the requested data, which describe where the C++ structure is used, the different values and/or states of the C++ structure are retrieved, and those values and states are returned to the user via the memory trace API 136.

Figure 1B:
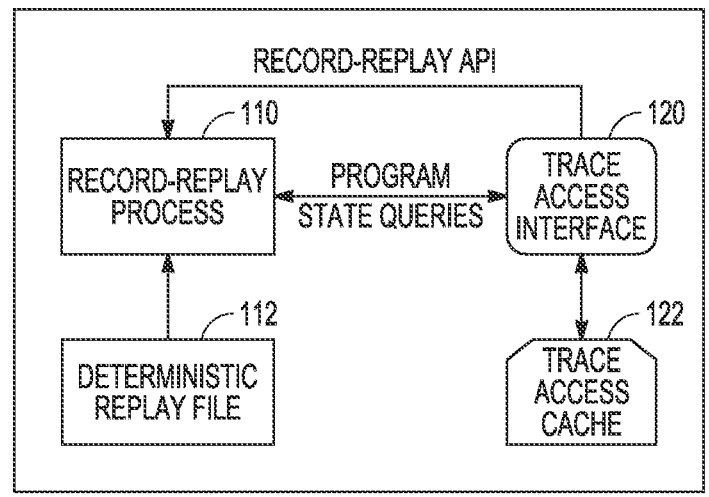
FIG. 1B is a block diagram of an example embodiment of a trace access interface of a system of annotated deterministic trace abstraction for advanced dynamic program analyses.

Referring to FIG. 1B, the annotations communicate regarding data to gather or operations to perform during the deterministic replay. The trace access interface 120 translates the annotations and trace API requests into the record-replay commands. These commands can implement such features as breakpoints, callbacks, and branches. The trace access interface 120 returns data from the record-replay process 110 or the trace access cache 122 to the respective trace API (136, 144, 154). It is noted that the trace access abstraction, when used with the trace access cache 122, allows for an on-demand query of execution data. The deterministic trace abstraction consequently is faster and more flexible then prior processes.

Figure 2:
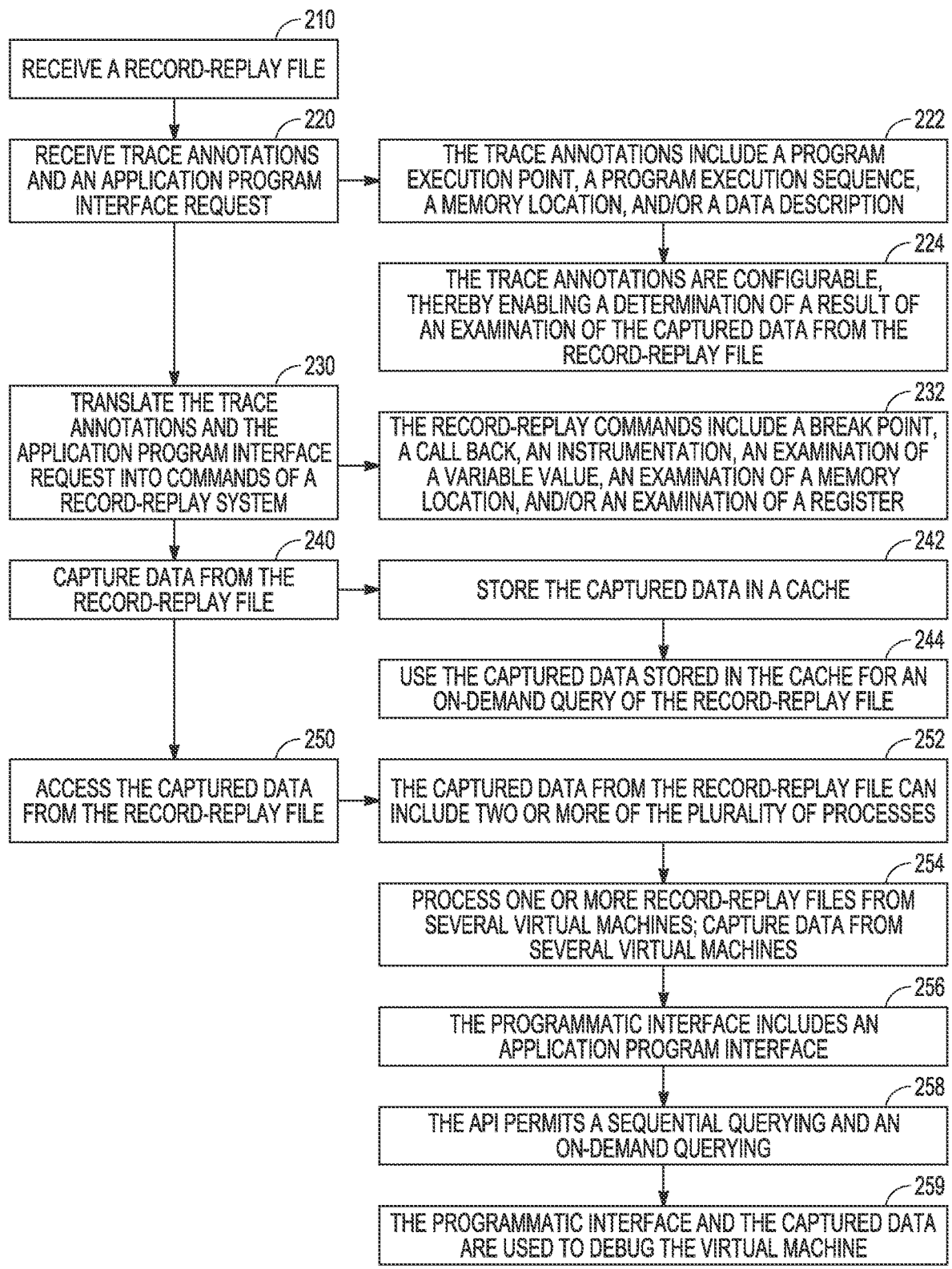
FIG. 2 is a block diagram illustrating features and operations of an example embodiment of a system of annotated deterministic trace abstraction for advanced dynamic program analyses.

FIG. 2 illustrates process, operation, and/or feature blocks 210-259. Though arranged substantially serially in the example of FIG. 2, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIG. 2, at 210, a record-replay file is received into a computer processor and/or computer system. The record-replay file is created via an instrumentation framework. A minimal set of data that is required for system replay is captured by the record-replay such as input/output data and external environment data (network interactions, external device input/output, etc.). More specifically, the data collection as provided by the trace request, annotations, and trace abstraction uses the record-replay system to replay the execution using this minimal set of data in order to capture a specific set of data that the trace request is seeking. These data are captured in the deterministic replay file. The record-replay provides instrumentation or callbacks to captured data in which users may be interested. The record-replay commands are created given the annotations (provided ahead of time) and an API request. The commands themselves are translated into instrumentation such as breakpoints/callbacks or queries to perform against program state at requested points in time. For example, the record-replay can provide instruction level callbacks as well as event callbacks that give tools the opportunity to capture what the tools are seeking. In an embodiment, the virtual machine emulates a system of a plurality of processes. Another embodiment emulates a group of virtual machines, thereby emulating a system of systems and/or multiple hosts.

Once a record-replay file is available, at 220, trace annotations are received into the computer processor and/or computer system. For example, a trace annotation can be a memory trace annotation, such as to examine certain memory locations, and/or to examine certain data structures, such as a particular linked list. As noted at 222, the trace annotations can include such data as a program execution point, a program execution sequence, a memory location, and a data description. The trace annotations are configurable, thereby enabling a determination of a result of an examination of the captured data from the record-replay file (224).

At 230, the trace annotations and trace API requests are translated into commands of the particular record-replay technology/system that is being used. As indicated at 232, the record-replay commands can include data such as a break point, a call back, an identification of a particular record-replay instrumentation, an examination of a variable value, an examination of a memory location, and an examination of a register Then, at 240, the record-replay commands capture data from the record-replay file. At 242, the captured data are stored in a cache, and at 244, the captured data stored in the cache are used for an on-demand query of the record-replay file.

Thereafter, at 250, a programmatic interface accesses the captured data from the record-replay file, thereby permitting a programmatic access to the trace of the execution of the virtual machine. In an embodiment, this programmatic access permits a replay of the execution of the virtual machine as if it were a live execution. As noted at 252, the captured data from the record-replay file can include two or more of the plurality of processes. Similarly, as indicated at 254, one or more record-replay files from a plurality of virtual machines can be processed, and the programmatic interface captures data from several of the plurality of virtual machines. In an embodiment, the programmatic interface includes an application program interface (256). At 258, the API permits a sequential querying and an on-demand querying. At 259, the programmatic interface and the captured data are used to debug the system of the plurality of processes.

Figure 3:
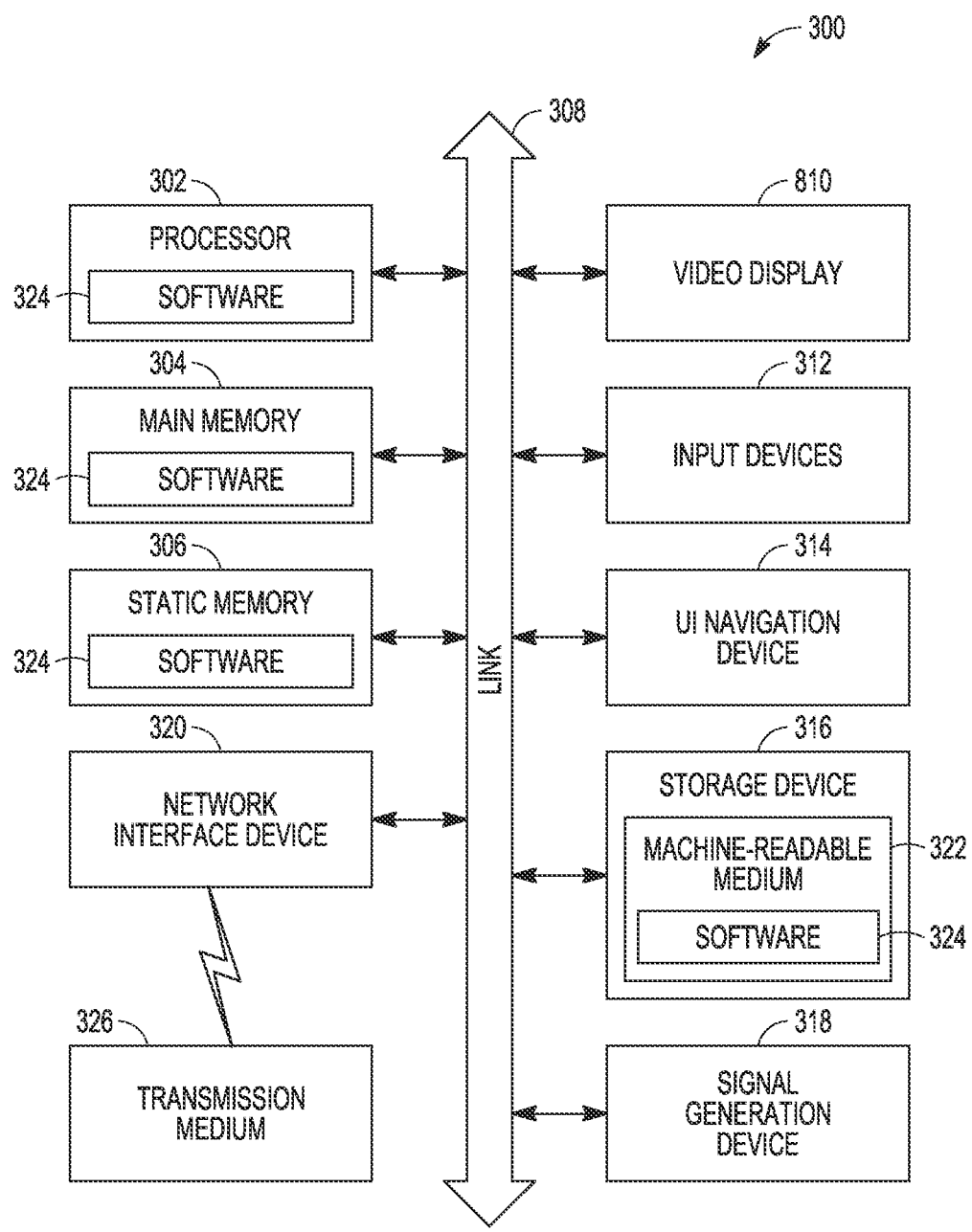
FIG. 3 is a block diagram of a computer system upon which one or more of the disclosed embodiments can execute.

FIG. 3 is a block diagram illustrating a computing and communications platform 300 in the example form of a general-purpose machine on which some or all the operations of FIG. 2 may be carried out according to various embodiments. In certain embodiments, programming of the computing platform 300 according to one or more particular algorithms produces a special-purpose machine upon execution of that programming. In a networked deployment, the computing platform 300 may operate in the capacity of either a server or a client machine in server-client network environments, or it may act as a peer machine in peer-to-peer (or distributed) network environments.

Example computing platform 300 includes at least one processor 302 (e.g., a central processing unit (CPU), a graphics processing unit (GPU) or both, processor cores, compute nodes, etc.), a main memory 304 and a static memory 306, which communicate with each other via a link 308 (e.g., bus). The computing platform 300 may further include a video display unit 310, input devices 312 (e.g., a keyboard, camera, microphone), and a user interface (ISI) navigation device 314 (e.g., mouse, touchscreen). The computing platform 300 may additionally include a storage device 316 (e.g., a drive unit), a signal generation device 318 (e.g., a speaker), and a RF-environment interface device (RFEID) 320.

The storage device 316 includes a non-transitory machine-readable medium 322 on which is stored one or more sets of data structures and instructions 324 (e.g., software) embodying or utilized by any one or more of the methodologies or functions described herein. The instructions 324 may also reside, completely or at least partially, within the main memory 304, static memory 306, and/or within the processor 302 during execution thereof by the computing platform 300, with the main memory 304, static memory 306, and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions 324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

UM 320 includes radio receiver circuitry, along with analog-to-digital conversion circuitry, and interface circuitry to communicate via link 308 according to various embodiments, Various form factors are contemplated for REI D 320, For instance, RFEID may be in the form of a wideband radio receiver, or scanning radio receiver, that interfaces with processor 302 via link 308. In one example, link 308 includes a PCI Express (PCIe) bus, including a slot into which the NIC form-factor may removably engage. In another embodiment, RFEID 320 includes circuitry laid out on a motherboard together with local link circuitry, processor interface circuitry, other input/output circuitry, memory circuitry, storage device and peripheral controller circuitry, and the like. In another embodiment, RFEID 320 is a peripheral that interfaces with link 308 via a peripheral input/output port such as a universal serial bus (USB) port. RFEID 320 receives RF emissions over wireless transmission medium 326. RFEID 320 may be constructed to receive RADAR signaling, radio communications signaling, unintentional emissions, or some combination of such emissions.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein," Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process comprising:
receiving into a computer processor a record-replay file, the record-replay file created via an execution of a virtual machine using the computer processor, the virtual machine comprising a system of a plurality of processes;
receiving into the computer processor a trace annotation and an application program interface (API) request;
translating the trace annotation and the application program interface request into a record-replay command;
using the record-replay command to capture data from the record-replay file;
accessing the captured data from the record-replay file;
storing the captured data in a cache; and
using the captured data stored in the cache for an on-demand query of the record-replay file.

2. The process of claim 1, wherein the trace annotation comprises one or more of a program execution point, a program execution sequence, a memory location, and a data description.

3. The process of claim 1, wherein the record-replay command comprises one or more of a break point, a call back, an instrumentation, an examination of a variable value, an examination of a memory location, and an examination of a register.

4. The process of claim 1, wherein the trace annotation is configurable, thereby enabling a determination of a result of an examination of the captured data from the record-replay file.

5. The process of claim 1, wherein an examination of the captured data from the record-replay file comprises two or more of the plurality of processes.

6. The process of claim 1, comprising receiving into the computer processor one or more record-replay files from a plurality of virtual machines, and wherein a programmatic interface captures data from two or more of the plurality of virtual machines.

7. The process of claim 1, comprising creating a programmatic interface to access the captured data from the record-replay by querying the captured data via an application program interface.

8. The process of claim 7, wherein the access of the captured data via the application program interface comprises a sequential querying and an on-demand querying.

9. The process of claim 1, comprising using a programmatic interface and the captured data to debug the system of the plurality of processes.

10. A non-transitory computer-readable medium comprising instructions that when executed by a processor execute a process comprising:
receiving into a computer processor a record-replay file, the record-replay file created via an execution of a virtual machine using the computer processor, the virtual machine comprising a system of a plurality of processes;
receiving into the computer processor a trace annotation and an application program interface (API) request;
translating the trace annotation and the application program interface request into a record-replay command;
using the record-replay command to capture data from the record-replay file;
accessing the captured data from the record-replay file;
storing the captured data in a cache; and
using the captured data stored in the cache for an on-demand query of the record-replay file.

11. The non-transitory computer-readable medium of claim 10, wherein the trace annotation comprises one or more of a program execution point, a program execution sequence, a memory location, and a data description.

12. The non-transitory computer-readable medium of claim 10, wherein the record-replay command comprises one or more of a break point, a call back, an instrumentation, an examination of a variable value, an examination of a memory location, and an examination of a register.

13. The non-transitory computer-readable medium of claim 10, wherein the trace annotation is configurable, thereby enabling a determination of a result of an examination of the captured data from the record-replay file.

14. The non-transitory computer-readable medium of claim 10, wherein an examination of the captured data from the record-replay file comprises two or more of the plurality, of processes.

15. The non-transitory computer-readable medium of claim 10, comprising instructions for receiving into the computer processor one or more record-replay files from a plurality of virtual machines, and wherein ae programmatic interface captures data from two or more of the plurality of virtual machines.

16. The non-transitory computer-readable medium of claim 10, wherein the accessing the captured data from the record-replay file comprises querying of the captured data via an application program interface; and wherein the accessing the captured data via the application program interface comprises a sequential querying and an on-demand querying.

17. The non-transitory computer-readable medium of claim 10, comprising instructions for using a programmatic interface and the captured data to debug the system of the plurality of processes.

18. A system comprising:
a computer processor; and
a computer memory coupled to the computer processor;
wherein the computer processor and the computer memory are operable for:
receiving into the computer processor or computer memory a record-replay file, the record-replay file created via an execution of a virtual machine using the computer processor, the virtual machine comprising a system of a plurality of processes;
receiving into the computer processor or computer memory a trace annotation and an application program interface (API) request;
translating the trace annotation and the application program interface request into a record-replay command;
using the record-replay command to capture data from the record-replay file; and
accessing the captured data from the record-replay file;
storing the captured data in a cache; and
using the captured data stored in the cache for an on-demand use of the record-replay file.

* * * * *